United States Patent [19]

Denton

[11] Patent Number: 4,562,570
[45] Date of Patent: Dec. 31, 1985

[54] VIDEO DISC TURNTABLE HAVING CLAMPING DEVICE

[75] Inventor: Jerry N. Denton, Knoxville, Tenn.

[73] Assignee: North American Philips Consumer Electronics Corp., New York, N.Y.

[21] Appl. No.: 555,740

[22] Filed: Nov. 28, 1983

[51] Int. Cl.[4] ............................................. G11B 9/06
[52] U.S. Cl. ................................................... 369/270
[58] Field of Search ................................ 369/270, 271

[56] References Cited

U.S. PATENT DOCUMENTS 3,871,663  3/1975  Stave .................................... 369/270
4,390,979  6/1983  Saito et al. ........................... 369/270

Primary Examiner—Steven L. Stephan
Attorney, Agent, or Firm—Thomas A. Briody; William J. Streeter; Marianne Rich

[57] ABSTRACT

A turntable for use in a video disc playback unit includes a hub assembly adapted to fit within a central spindle aperture in the disc. The disc is secured in position by a plurality of clamp members pivotally mounted for movement in a radial direction around the circumference of the hub. When the turntable is at rest the clamp members retract into the hub to allow installation and removal of the disc. As the rotational speed of the turntable increases, centripetal force causes the clamp members to swing radially outwardly to engage the disc, thereby clamping the disc to the rotating turntable.

5 Claims, 8 Drawing Figures

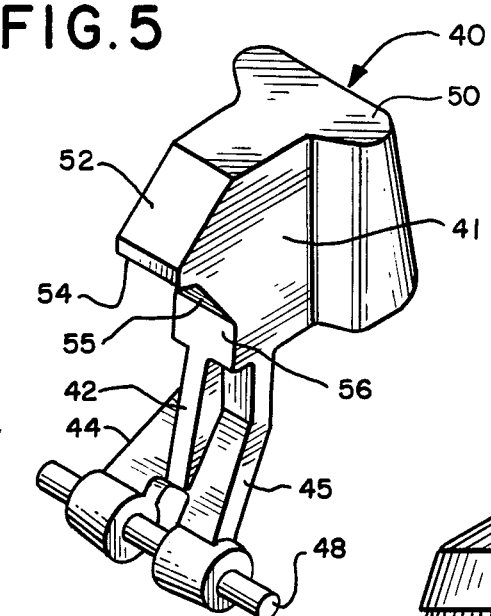
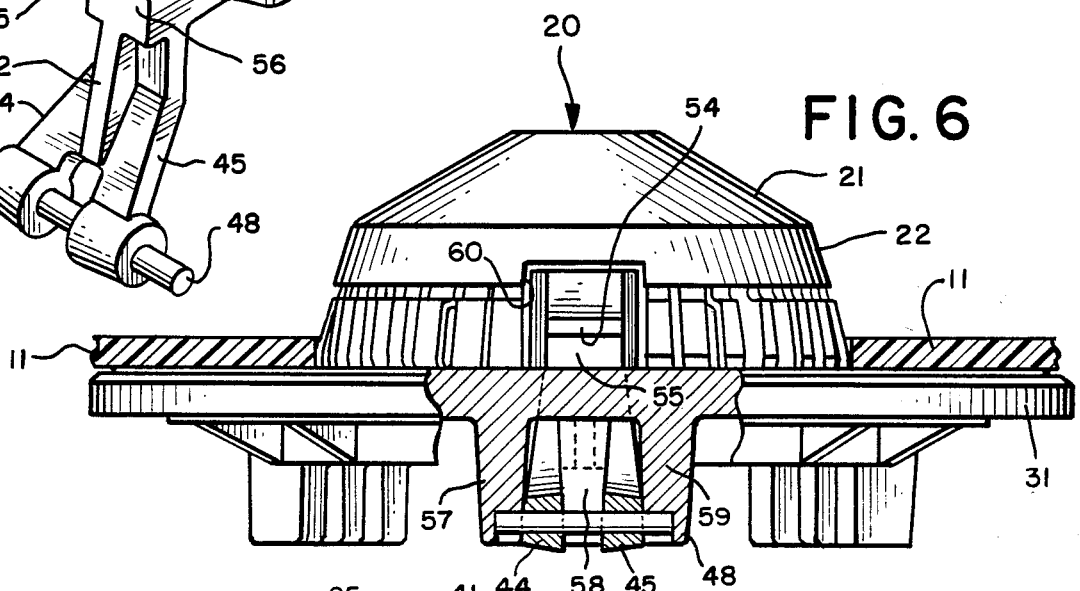
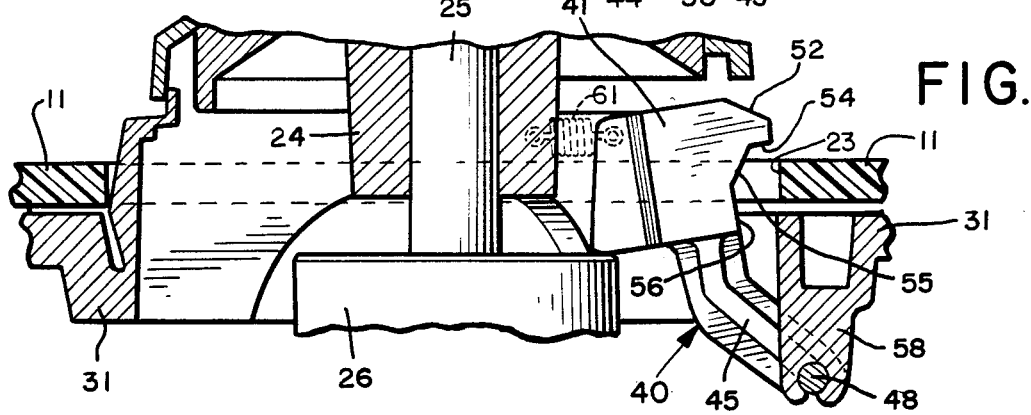
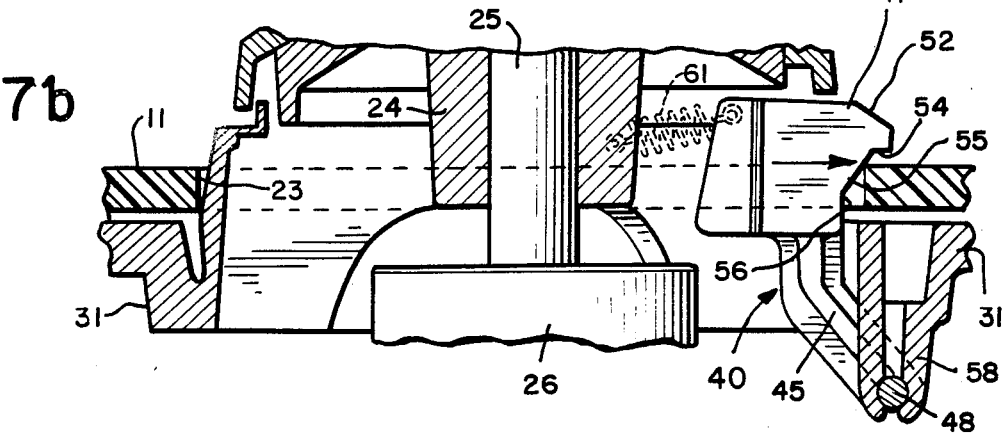

VIDEO DISC TURNTABLE HAVING CLAMPING DEVICE

BACKGROUND OF THE INVENTION

Recent developments in laser technology have made practical the commercial production of laser-based consumer electronic products. One such product is a video playback unit which uses a focused laser beam to optically retrieve a previously recorded video signal from a spiral recording track on a rapidly rotating reflective optical recording disc. Since no stylus is required to mechanically engage a groove in the recording disc, the optical disc is subject to virtually no wear during playback. Additionally, since the disc includes a protective coating, the outer surface of which is substantially removed from the plane of focus of the laser beam, the quality of the recovered signal is relatively unaffected by the presence of dust, fingerprints or scratches on the disc surface.

While these attributes make optical laser discs an ideal medium for conveying pre-recorded television and audio signals, there are technical problems which must be overcome in developing a practical playback unit. One of these problems involves accurately following the spiral recording track with a focused laser beam during playback. Since a typical recording track is approximately 0.0004 millimeters in width and moves outward a distance of about 0.0016 millimeter per revolution, it will be appreciated that considerable precision is required in following such a track with a laser beam.

During playback, a standard laser disc is rotated by means of a turntable at standard speeds of either 1800 or 1500 r.p.m. A movable laser beam deflection carriage, containing optical elements which direct and focus the laser beam, moves radially outward from the center of the turntable beneath the lower surface of the rotating disc. The motion of the carriage matches that of the relative radial motion of the recording track so that the laser beam approximately follows the path of the track. Because it is difficult if not impossible to achieve the required precision by purely mechanical means, many systems, such as those described in the U.S. Pat. Nos. 4,236,232, 4,359,635 and Re. 29,963, have been developed which employ an electrical feedback signal to minutely control the instantaneous position of the focused laser beam in order to precisely follow the recording track. While such electromechanical systems are effective, it is still necessary to reduce the mechanical discrepancies between motion of the carriage and of the track to a minimum in order to secure best performance. Accordingly, it has been an object of designers of such playback units to minimize imprecision in the mechanical structure of optical playback units.

One common source of mechanical imprecision is recording track eccentricity produced by reason of the recording disc not being precisely aligned with the axis of the rotating turntable. Accordingly, manufacturers of optical recording discs must carefully control the location and diameter of the spindle aperture in the disc, making these as close as possible to those of the turntable hub.

However, the spindle aperture must not be so small as to interfere with normal installation and removal of the disc in the face of normal manufacturing tolerances. Consequently, the spindle aperture is sized slightly larger than the hub. Some means for clamping or otherwise securing the disc to the turntable is then required to assure that no relative motion of the disc and turntable occurs during operation of the playback unit.

The present invention overcomes the problem of disc misalignment by providing a tapered hub assembly which includes centrifugally-actuated clamp members which operate when the disc and turntable are rotating to automatically clamp the disc on the hub. Slight variations in the diameter of the spindle aperture are automatically compensated for by the tapered surface hub, which centers the disc relative to the axis of the turntable regardless of the size of the spindle aperture.

SUMMARY OF THE INVENTION

A turntable system for use in a video disc playback system positions a recording disc of the type having a central spindle aperture in a predetermined operating position on a rotating turntable platen. A hub assembly extends perpendicularly from the turntable in axial alignment with the turntable. The hub assembly is dimensioned as to be received within the spindle aperture. A plurality of clamp members disposed around the circumference of the hub are each mounted for movement in a radial direction relative to the turntable platen. Rotation of the platen causes the clamp members to each move radially outwardly from the hub to engage the recording disc whereby the disc is automatically positioned and clamped in the predetermined operating position.

BRIEF DESCRIPTION OF THE DRAWINGS

The features of the present invention which are believed to be novel are set forth with particularity in the appended claims. The invention, together with the further objects and advantages thereof, may be understood by reference to the following description taken in conjunction with the accompanying drawings, in the several figures in which like reference numerals identify like elements, and in which:

FIG. 5 is an enlarged perspective view of a clamp member used in the disc clamping mechanism illustrated in FIGS. 3 and 4.

FIG. 6 is a side elevational view, partially in section, of the turntable hub assembly taken along line 6—6 of FIG. 3 showing the mounting of a clamp member therein.

FIGS. 7a and 7b are fragmentary side cross-sectional views of principal elements of the hub clamping mechanism showing a clamp member being actuated from an unclamped position in FIG. 7a to a clamped position in FIG. 7b.

DESCRIPTION OF THE PREFERRED EMBODIMENT

Figure 1:
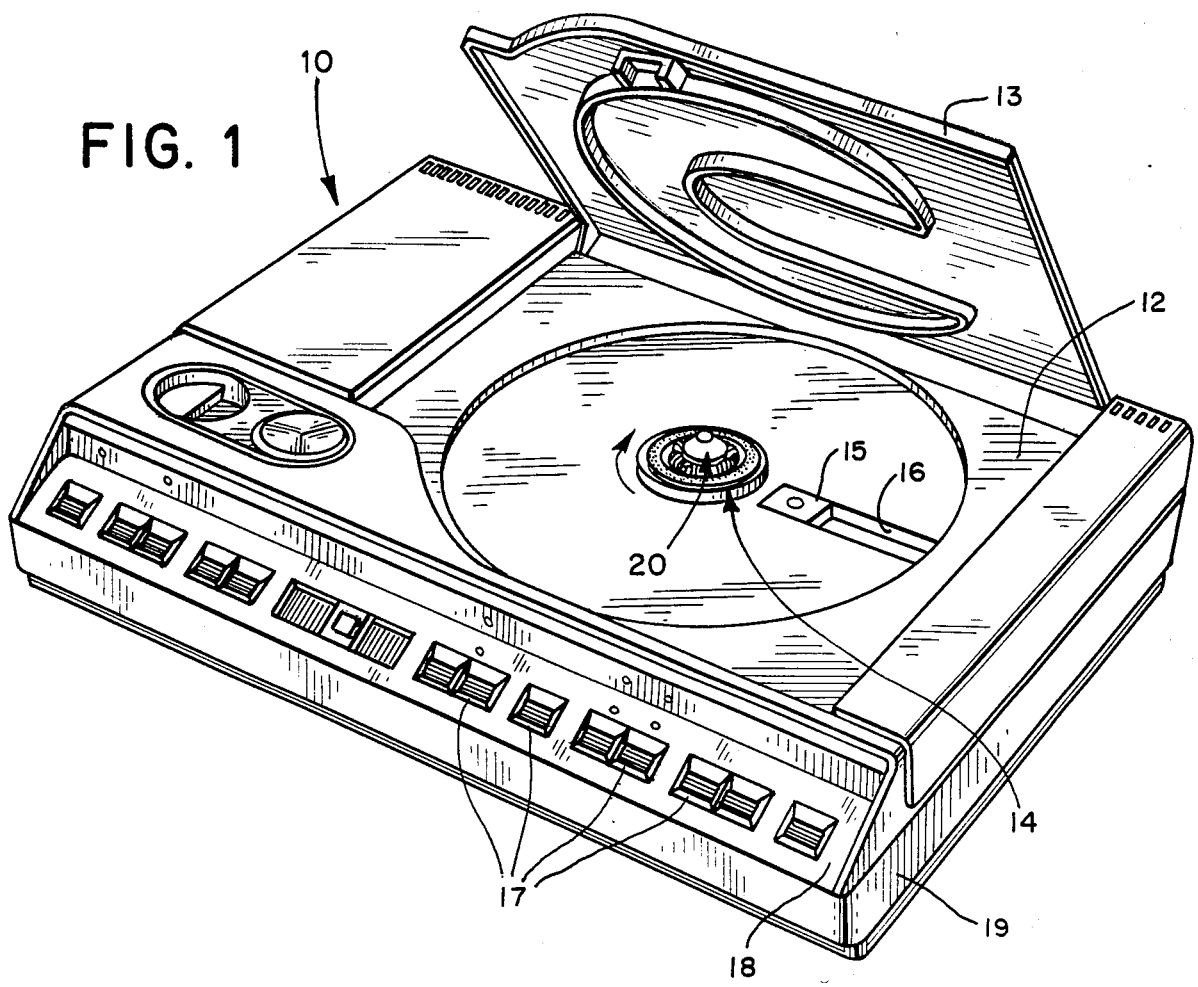
FIG. 1 is a perspective view of a video disc playback unit incorporating a turntable system constructed in accordance with the invention.

Referring to the figures, and particularly to FIG. 1, a video disc player unit having a turntable system constructed in accordance with the present invention is indicated generally by reference numeral 10. The player unit is adapted to receive a standard optical video disc 11 (FIG. 2) within a compartment 12 provided on its upper surface. A lid 13 hingedly attached at the upper rear edge of the player overlies the recess to form an enclosure for the video disc while the player is in use.

Within compartment 12 the video disc 11 is rotated by a turntable system 14 at a standard speed of either 1500 or 1800 r.p.m. To recover previously recorded audio and video information from the rotating video disc, the player is provided with optical components mounted on a carriage 15 of conventional construction and arranged for radial motion along a channel 16 provided in the bottom surface of compartment 12. A beam of coherent light generated by a laser (not shown) within the player, is directed through the optical elements of carriage 15 onto the lower surface of the rotating video disc to recover the prerecorded audio and video signals for playback on a conventional television receiver (not shown). In accordance with standard practice, the video disc rotates in the direction shown by the arrow while carriage 15 moves radially outward from the inner portion of the disc toward the outer portion of the disc. A plurality of switches and controls 17 on a front panel 18 enable the user to control the operation of the unit, including the selection of special functions such as slow motion and freeze action displays.

Figure 2:
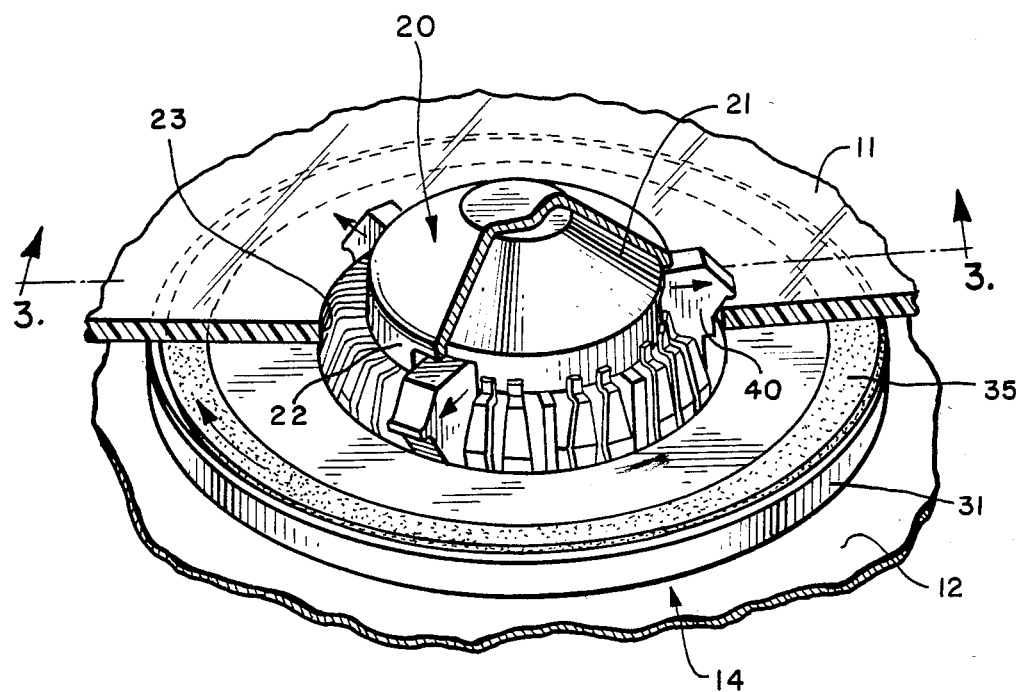
FIG. 2 is a fragmentary perspective view of the hub assembly of the turntable system shown in FIG. 1 showing the automatic disc clamping mechanism thereof.
Figure 3:
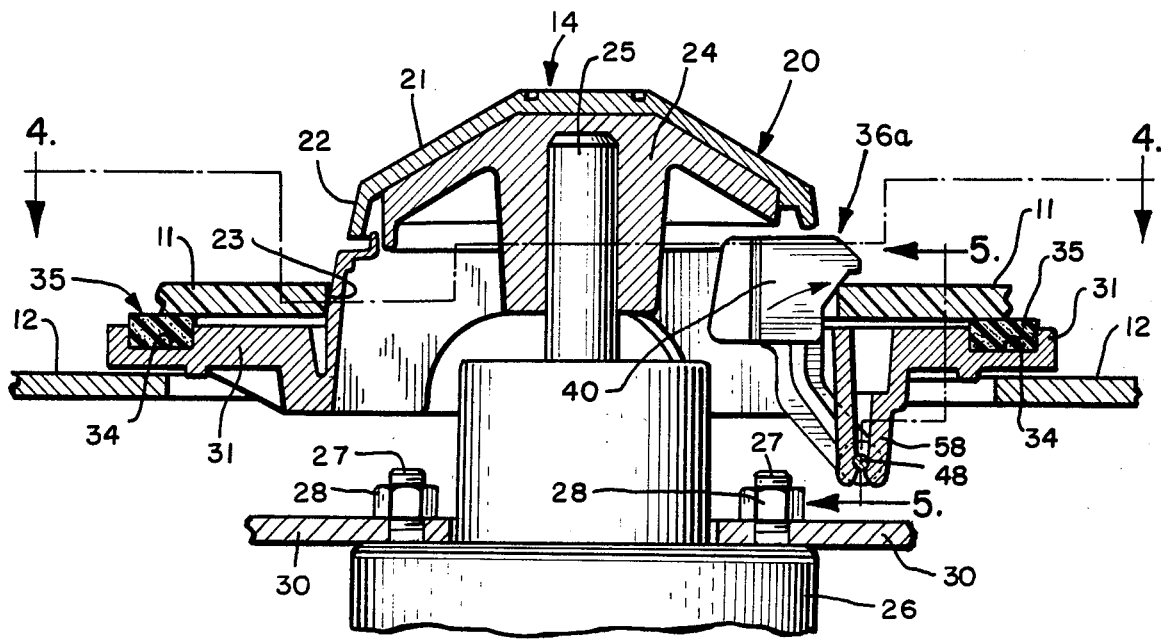
FIG. 3 is an enlarged cross-sectional view of the turntable hub assembly and automatic disc clamping mechanism provided therein taken along line 3—3 of FIG. 2.

Referring to FIGS. 2 and 3, the turntable system 14 includes a central hub assembly 20. The hub assembly, which may be constructed of machined aluminum or the like, is generally cylindrical in form and includes upper and lower tapered portions 21 and 22. As shown, the upper tapered portion 21 has a greater taper than the lower tapered portion 22, which is dimensioned to be received within the spindle aperture 23 of video disc 11. In use, a disc placed over hub 20 descends on the tapered portion 22 until the sidewall of the hub contacts the sidewall of spindle aperture 23, thereby compensating for slight variations in the diameter of the spindle aperture.

Within the hub, a body member 24 includes a centrally located recess for receiving the vertical shaft 25 of a motor 26. The motor may be mounted by means of machine screws 27 and nuts 28 to a chassis 30 positioned beneath and parallel with the bottom wall of compartment 12.

Turntable system 14 includes a generally disc-shaped turntable platen 31 which is of greater diameter than hub member 24 and provides a horizontal rotating surface upon which video disc 11 is carried during playback. The upper surface of platen 31 is provided with a rectangular channel 34 (FIG. 3) which extends circumferentially adjacent its outer edge. In order to provide the turntable with an engaging surface for contacting the lower surface of video disc 11, a ring-shaped gasket 35, received in channel 34, extends somewhat above the platen surface. The gasket may be fashioned from rubber or similar material in order to provide a non-marring surface having a high coefficient of friction.

Figure 4:
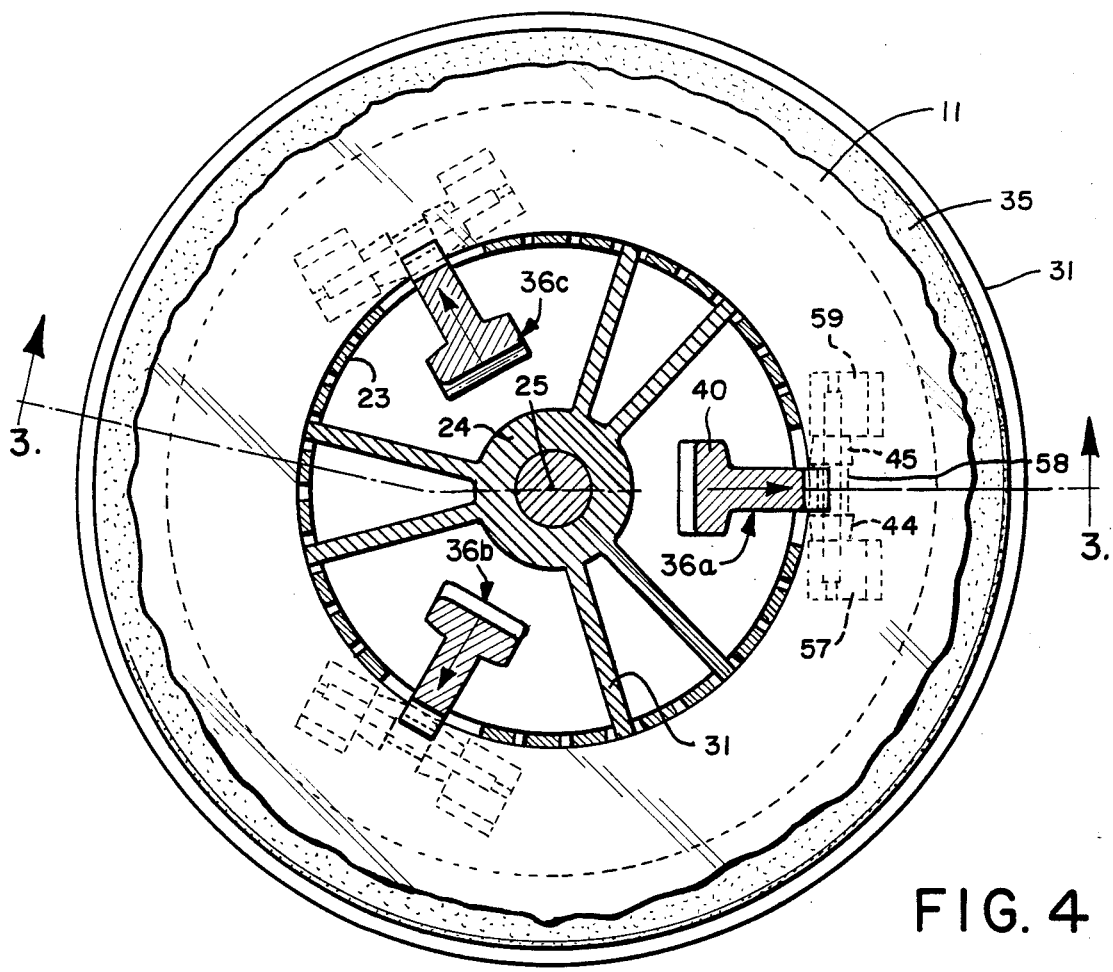
FIG. 4 is a cross-sectional view of the turntable hub assembly taken along line 4—4 of FIG. 3.

In order to more accurately and securely position a video disc on the rotating turntable 14, the hub assembly 20, in accordance with the present invention, is equipped with a centrifugally actuated automatic clamping device in the form of three clamp assemblies 36a–36c disposed at 120° intervals along the outer circumference of the hub assembly as shown in FIG. 4. As shown in FIG. 5, each clamp assembly includes a clamp member 40. Each clamp member is seen to include a weighted head portion 41 and an arm portion 42. The bottom end of the arm portion is provided with an inverted U-shaped cut-out which forms a pair of parallel-spaced tine portions 44 and 45. Each of these tine portions includes an aperture for receiving a pivot pin 48. As shown, pivot pin 48 passes through both tine portions and extends beyond the outer ends of each to provide a pivotal mounting for the clamp member 40.

Referring further to FIG. 5, the head portion 41 includes a flat horizontal upper surface 50, and a bevelled outer surface 52 extending downwardly from upper surface 50 along the forward edge of the head portion. Below the level of bevelled surface 52, the outer edge of head 41 is cut away to form a horizontal engaging lip 54 therein. The area behind the lip includes a downwardly sloped surface 55 and a vertical surface 56 which extends to the base of the weighted head portion 41.

Referring again to FIG. 5, it can be seen that because of the downwardly sloped arm portion 42, the center of gravity of the weighted head portion 41 is horizontally displaced from a vertical constructed perpendicular to pivot pin 48. Consequently, when clamp member 36 is pivotally mounted about the pivot pin, gravity will tend to cause the clamp member to rotate about pin 48.

Referring to FIGS. 3, 4 and 6, the turntable system 14 is seen to include three sets of three downwardly projecting mounting pillars each extending from the bottom surface of platen 31 for pivotally mounting respective ones of clamp members 36 to the platen. The first set for mounting clamp member 40, comprises pillars 57, 58 and 59, dimensioned to fit on either side of and between the tine portions 44 and 45 of clamp member 40. Each of the pillars is provided with an aperture which receives pivot pin 48 whereby the clamp member is free to pivot with respect to the turntable platen 31. As best illustrated in FIG. 4, the location of the mounting pillars is such that pivot pin 48 is disposed tangentially with respect to hub 20. Consequently, pivotal motion of clamp member 36 results in radial movement of the weighted head portion 41 toward or away from shaft 25. The lower tapered portion 22 of hub 20 is provided with an aperture 60 through which the clamp member can pass.

The operation of the clamp member 40 is illustrated in FIGS. 7a and 7b. As shown, the center of gravity of the clamp member is at a lesser radial distance from shaft 25 than is pivot pin 48. Accordingly, as previously developed, gravitational force causes the clamp member to fall inwardly toward the shaft to occupy the position shown in FIG. 7a. In this position, lip 54 does not project beyond the outer circumference of hub 20, permitting video discs to be installed or removed from the hub. Since the center of gravity is also above the horizontal level of pivot pin 48, radially outwardly directed centrifugal force, such as that developed by rotation of turntable platen 31, results in rotation of clamp member 40 about pivot pin 48 to the position illustrated in FIG. 7b. The inclined surface 55 of head 41 now contacts the edge 23 of video disc 11, forcing the disc down onto platen 31.

Clamp assemblies 36b and 36c, which are structurally and functionally identical to clamp assembly 36a, are similarly actuated as the rotational speed of the turntable increases. The simultaneous radial displacement of the clamp members associated with these assemblies results in balanced radially-outward forced being applied to the wall of the spindle aperture 31 of disc 11 which assists in aligning disc 11.

Rotation of the clamp member from the unclamped to the clamped position occurs when the rotational rate of the turntable is such that the clockwise torque developed by centripetal acceleration of the weighted head portion is sufficient to overcome the counter-clockwise torque acting on the clamp member by reason of gravitational forces acting on the head portion. As the mass of the head portion is the same for each of the developed torques, the rotational rate of the turntable at which the clamp member moves to the clamped position is independent of clamp member mass and depends primarily on the ratio of the horizontal displacement of the clamp member center of mass to the vertical displacement of the center of mass from the center axis of pivot pin 48. As these dimensions can be accurately controlled during manufacture, it is possible to closely control the rotational rate at which automatic clamping occurs.

In the standard laser disc embodiment described, the pivot pin 48 is located 0.75 inches from the center of shaft 25, while the clamp member center of gravity is spaced 0.17 inches horizontally and 0.51 inches vertically from the pivot. With these dimensions, the clamp assemblies automatically rotate to the clamped position when the turntable reaches a rotational speed of approximately 200–300 r.p.m. It will be appreciated that these dimensions may be varied as to achieve automatic clamping at any other desired rotational rate.

It will be appreciated that other constructions can be utilized for the clamping member. For example, a slidably mounted element could be provided in a radial channel in the turntable hub, with a spring providing a bias toward the hub which is overcome by centripetal force. Also, a bias spring 61, such as illustrated in phantom in FIGS. 7a and 7b, could be used in conjunction with the illustrated clamp member construction to bias the member toward the hub to delay engagement to a higher turntable speed. Futhermore, it will be appreciated that a turntable equipped with a clamping device as described herein may be used to rotate discs other than optical video recording discs. For example, such a turntable may be well suited for use in audio systems or in any other such system wherein it is desired to firmly clamp a disc-shaped member to a rotating surface.

While a particular embodiment of the invention has been shown and described, it will be obvious to those skilled in the art that changes and modifications may be made therein without departing from the invention in its broader aspects, and, therefore, the purpose in the appended claims is to cover all such changes and modifications as fall within the true spirit and scope of the invention.

I claim:

1. A turntable system for a recording disc of the type having a spindle aperture provided centrally therein, comprising:

a rotary driven turntable for rotating the disc;

a generally cylindrical hub affixed to and extending perpendicularly upward from the turntable, said hub being disposed so that its central axis is aligned with the axis of rotation of the turntable and so dimensioned as to be received within the spindle aperture provided in the recording disc; and at least one clamp member disposed along the outer circumference of said hub pivotally attached thereto, said clamp member being mounted for relative lateral motion with respect to said hub along a path extending radially from the axis of rotation thereof, so that rotation of said hub causes said clamp member to pivot outwardly from the circumference of said hub to engage the recording disc, thereby automatically clamping the disc to the turntable; and wherein said clamp member includes a substantially vertical leg portion and a downwardly sloped leg portion integrally formed and axially aligned with said vertical leg portion at the lower end thereof, said clamp member further including a weighted head portion attached to the upper end of said vertical leg portion and a pivot assembly formed at the lower outer most end of said downwardly sloped leg portion for pivotally attaching said clamp member to said hub, the point of pivotal attachment of said clamp member to said hub being more radially distant from the axis of rotation of said hub than the distance of said weighted head portion from said axis of rotation whereby said clamp member tends naturally to pivot toward said axis of rotation when the rotational angular velocity of said hub falls below a predetermined value.

2. A turntable system as defined in claim 1 wherein said weighted head portion of said clamp member is provided with a notch forming a lip in the outer surface thereof for engaging the recording disc along the edge surface formed by the spindle aperture therein.

3. A turntable system as defined in claim 2 wherein said outer face of said weighted head portion does not project beyond the surface formed by said outer circumference of said hub when said hub has a rotational velocity less than said predetermined value.

4. A turntable system as defined in claim 3 wherein said clamp member is pivotally mounted to said hub for movement from a first position wherein said outer face of said weighted head portion does not extend beyond the surface established by the outer circumference of said hub, to a second position wherein said outer surface of said weighted head portion projects beyond said outer surface of said hub to engage the edge of the spindle aperture when placed over said hub.

5. A turntable system as defined in claim 4 including three clamp members disposed at about 120° intervals around said outer circumference of said hub.

* * * * *